United States Patent
Abbott et al.

[11] Patent Number: 5,839,213
[45] Date of Patent: Nov. 24, 1998

[54] DIPPER DOOR ACTUATED LUBE PUMPING SYSTEM

[75] Inventors: Ronald E. Abbott; Theodore M. Willgrubs, both of Marion, Ohio

[73] Assignee: GPX Corp., Las Vegas, Nev.

[21] Appl. No.: 674,090

[22] Filed: Jul. 1, 1996

[51] Int. Cl.[6] ................................................ F01M 1/18
[52] U.S. Cl. .................................. 37/443; 184/64; 37/398
[58] Field of Search ........................... 37/442, 443, 444, 37/900, 398, 400; 184/6.1, 6.4, 6.19, 7.4

[56] References Cited

U.S. PATENT DOCUMENTS

| | | | |
|---|---|---|---|
| 2,870,849 | 1/1959 | Youngberg et al. | 172/413 |
| 2,975,865 | 3/1961 | Rumpel | 184/7 |
| 3,022,863 | 2/1962 | Sensui et al. | 184/7 |
| 3,682,273 | 8/1972 | Allard et al. | 184/6.4 X |
| 4,312,424 | 1/1982 | Taylor et al. | 184/6.4 |
| 4,509,895 | 4/1985 | Baron | 414/685 |
| 4,520,902 | 6/1985 | Snow | 184/7.4 |
| 4,674,030 | 6/1987 | Gabriel et al. | 364/184 |
| 4,930,600 | 6/1990 | Kumar et al. | 184/6.4 X |
| 5,060,760 | 10/1991 | Long et al. | 184/6.4 |
| 5,263,552 | 11/1993 | Cline et al. | 184/6.19 |
| 5,367,798 | 11/1994 | Hughes | 37/399 |
| 5,381,874 | 1/1995 | Hadank et al. | 184/6.4 |
| 5,417,308 | 5/1995 | Hartl | 184/6.19 X |
| 5,482,138 | 1/1996 | Mori et al. | 184/6.4 |

FOREIGN PATENT DOCUMENTS 662662  5/1979  U.S.S.R. ............... E02F 3/40

OTHER PUBLICATIONS

Lubriquip™ Product Specs & Ordering brochure; ©Houdaille Industries, Inc., 1972 (5 pages).

*Primary Examiner*—Terry Lee Melius
*Assistant Examiner*—Robert Pezzuto
*Attorney, Agent, or Firm*—Baker & Botts, L.L.P.

[57] ABSTRACT

A mining shovel (10) is provided with an automatic lubricant system controlled by movement of a portion for the mining shovel (10). The automatic lubrication system includes an actuator (51, 151, 251, 351) and a lubrication supply subsystem (53, 153, 253, 353). The lubrication supply subsystem (53, 153, 253, 353) delivers lubricant to a selected site in response to movement of the actuator (51, 151, 251, 351).

22 Claims, 6 Drawing Sheets

DIPPER DOOR ACTUATED LUBE PUMPING SYSTEM

TECHNICAL FIELD OF THE INVENTION

The present invention relates generally to mining shovels and more particularly to an automatic lubrication system for mining shovels.

BACKGROUND OF THE INVENTION

Mining shovels are used to move overburden and minerals in the mining process. Many mining shovels have dipper assemblies to scoop, contain and move this material. The dipper assembly contains a door which can be opened to deposit the contained material into a truck or other receptacle for transportation. For example, such an arrangement is shown in U.S. Pat. No. 4,509,895, which is incorporated herein for all purposes.

Mining shovels require proper levels of lubrication to key locations throughout the machine for maximum operating efficiency and long component life. Improper lubrication can lead to metal-to-metal contact, resulting in premature component failure and the necessity to cease operation of the entire mining shovel. Each component has specific needs as to frequency and volume of lubrication.

One past practice of providing lubrication was to manually apply lubrication to components while the mining shovel was inactive. Such a procedure contributes unfavorably to machine productivity, and leads to less than optimum distribution of lubrication to all machine components.

In an attempt to address inconsistencies of the manual method of lubrication, various gravity feed and simple accumulator systems have been developed. These systems operate without manual intervention, except to refill the associated reservoir with the lubricant during scheduled stoppages of the mining shovel. One disadvantage of these systems is the continued application of lubrication whether the machine is operating or idle. Additionally, the volume of lubricant dispensed is not consistent in the accumulator systems. As the pressure in the chamber decreases, the flow rate is typically diminished.

Another automatic system has been developed utilizing pumps, a method of metering, and a timed sequence for operation. Refinement of the timing control provides lubrication to only those locations in need, and limited the operation only to times the mining shovel was fully operational and requiring lubrication. A disadvantage of this system is the need for pneumatic or electric power to operate the pumps, and electric supply for the timer function. Additionally, the output of this system cannot readily be routed to all portions of the machine, particularly the dipper assembly and its associated components.

SUMMARY OF THE INVENTION

Therefore a need has arisen for an automatic lubricating system for mining shovels that eliminates or reduces the disadvantages of previous lubricating systems. According to an aspect of the present invention, an automatic lubricating system for mining shovels having a dipper assembly is provided. The system includes an actuator associated with movement of a portion of the dipper assembly and a pump mechanism pressurized by movement of the actuator. Additionally, the system may include a lubricant supply subsystem coupled to the pump mechanism for supplying lubrication to a selected location in response to pressurization of the pump mechanism.

According to another aspect of the present invention, a method for automatically lubricating a mining shovel is provided. That method includes providing a lubricant supply system for dispensing a lubricant; providing an actuator on the shovel such that a first portion of the actuator will move under the influence of gravity, the movement of the first portion being relative to the shovel and in response to movement of the shovel; activating a second portion of the actuator through movement of the first portion; and delivering lubricant from the lubricant supply subsystem to a selected site in response to activation of the second portion.

The invention has numerous technical advantages; some examples follow. A technical advantage of the present invention is that the lubrication is applied based on the lubrication requirements of the lubricated parts. Another technical advantage of the present invention is that an electrical source is not necessarily required. Yet another technical advantage of the present invention is that lubricant is not constantly applied regardless of whether lubricant is required. Another technical advantage of the present invention is that a consistent amount of lubrication can be applied.

BRIEF DESCRIPTION OF THE DRAWINGS

For a more complete understanding of the present invention and the advantages thereof, reference is now made to the following written description taken in conjunction with the accompanying drawings, in which.

DETAILED DESCRIPTION OF THE INVENTION

The preferred embodiments of the present invention and its advantages are best understood by referring to FIGS. 1–9 of the drawings, like numerals being used for like and corresponding parts of the various drawings.

Figure 1:
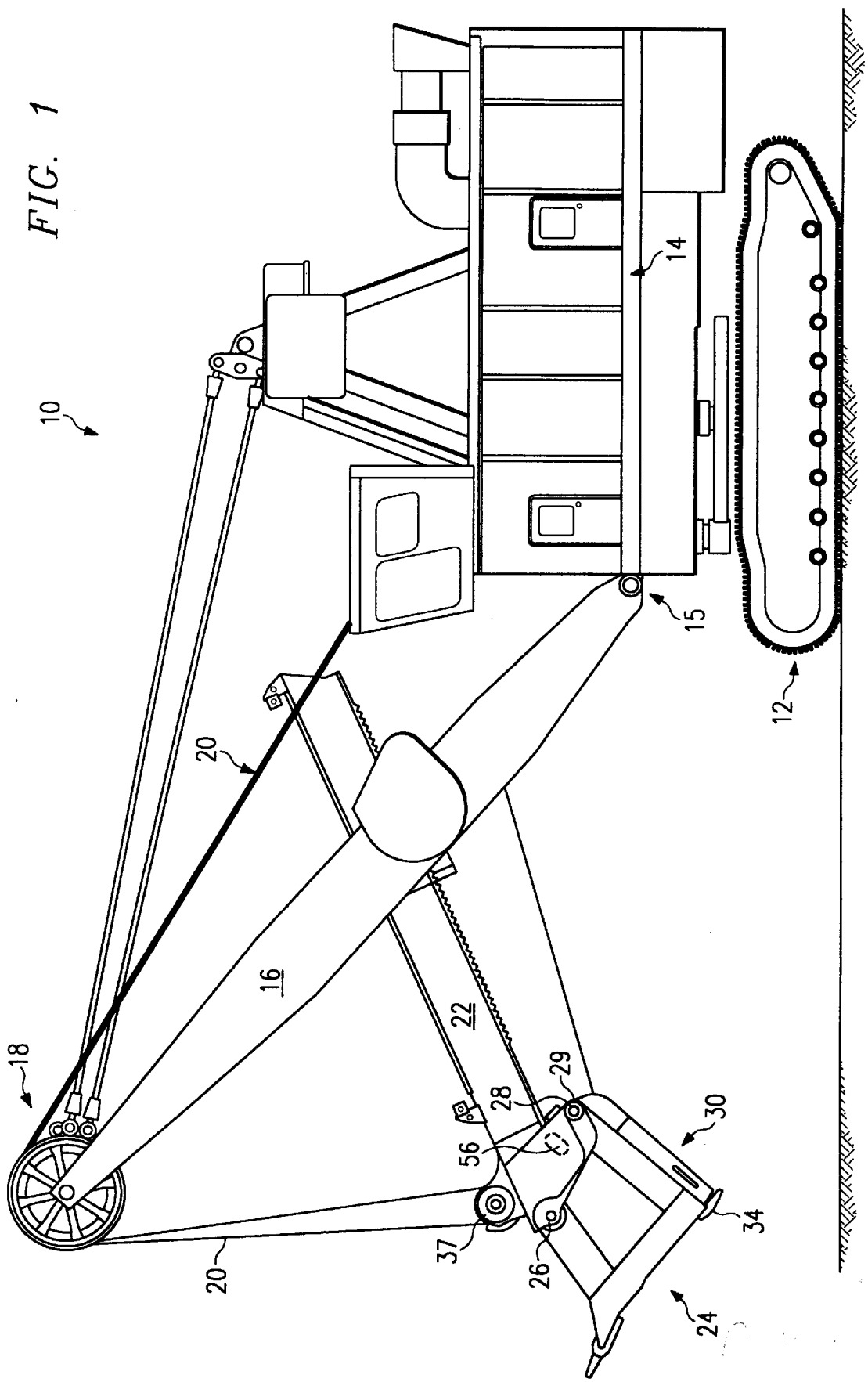
FIG. 1 is a left side elevation of a mining shovel for which the present invention is particularly suited.

Referring to FIG. 1, a mining shovel 10 is provided for which the present invention is particularly suited. One such mining shovel is the Marion Power Shovel 351M Version Mining Shovel. Mining shovel 10 includes a crawler unit 12 and an upper frame 14. Pivotally connected to upper frame 14 at connection point 15 is a boom structure 16. On one end of boom structure 16 is hoist sheave assembly 18, which supports a hoist rope 20. Hoist rope 20 runs above boom 16, and on to side of dipper handle 22.

Pivotally connected to boom structure 16 and supported in part by hoist rope 20 is a dipper handle 22. A dipper 24 is connected to dipper handle 22 through dipper connection pins 26 and 28. Pivotal about a line coaxial with dipper connection pins 28 is a dipper door 30, which couples with dipper 24 through dipper door connection pins 29. Dipper door 30 can be opened through release of a dipper latch 34. Hoist rope 20 helps to support dipper handle 22 at a bail sheave pin 37.

Figure 2:
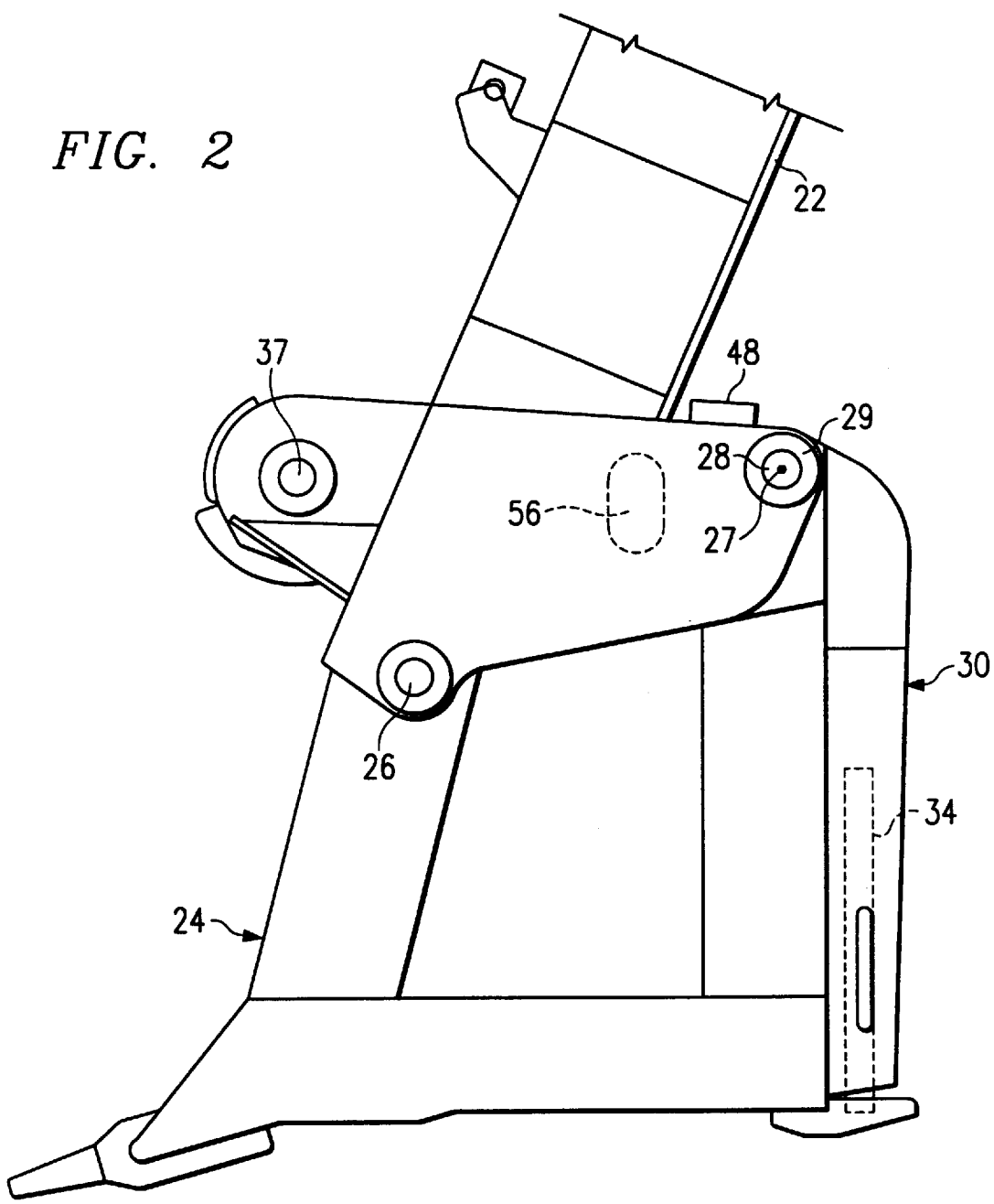
FIG. 2 is a left side elevation view in detail showing the dipper, door, and crowd handle.

Referring to FIG. 2, there is shown an expanded view of dipper 24 and dipper door 30. When dipper 24 is full of earth or other material and the operator desires to empty the dipper, dipper latch 34 is released and dipper door 30 pivots about a line coaxial with dipper connection pins 28 and dipper door connection pins 29, shown as dipper door pivot line 27. Also shown in FIG. 2 is one possible placement of a lubricant reservoir or accumulator 56, and one possible placement of a pump cylinder 48, which may be used to pump lubricant. The components are described further below.

Figure 3:
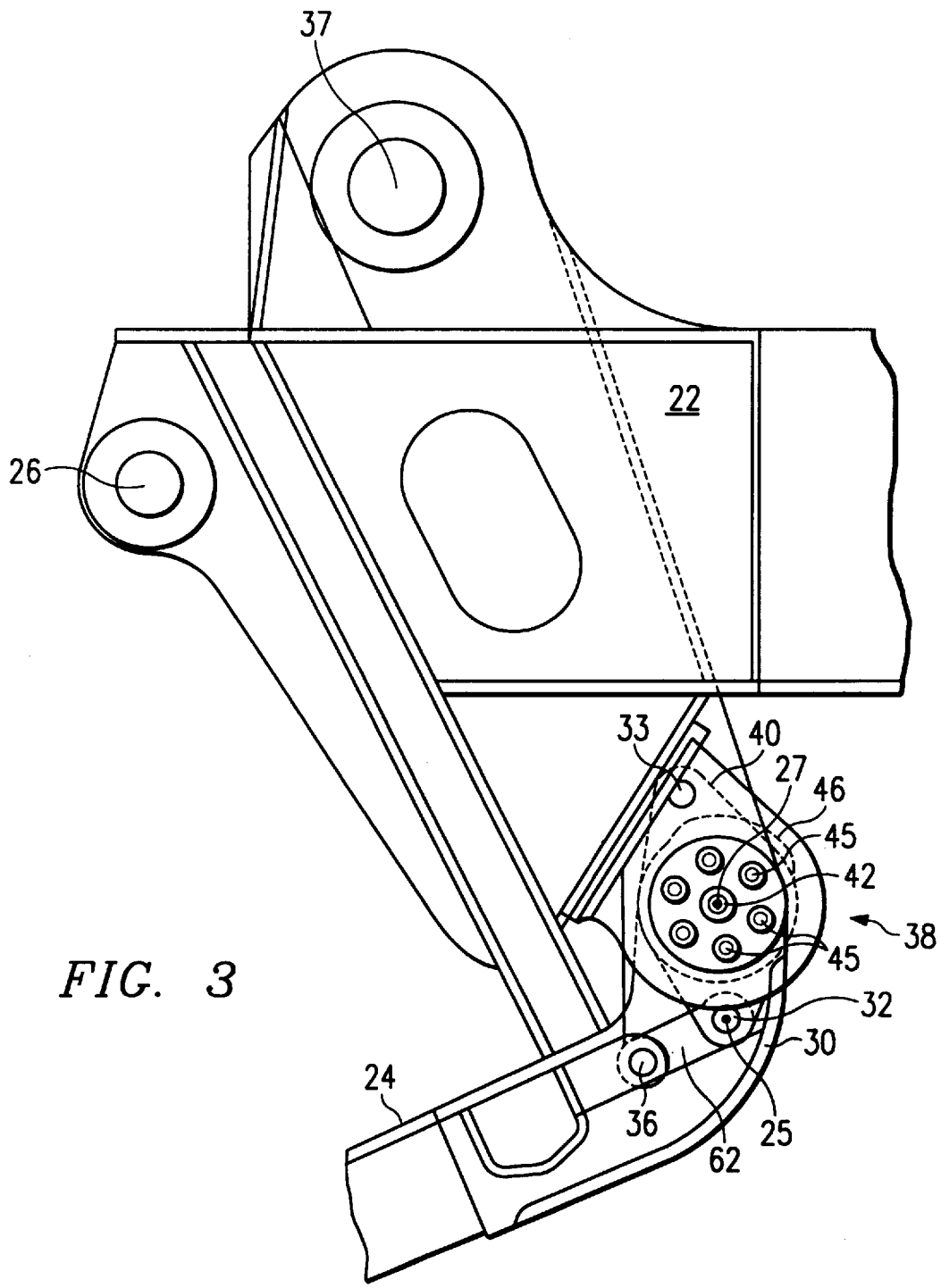
FIG. 3 is a left side elevation of the dipper door snubber mechanism, located midway between left and right extremes of the door width.
Figure 4:
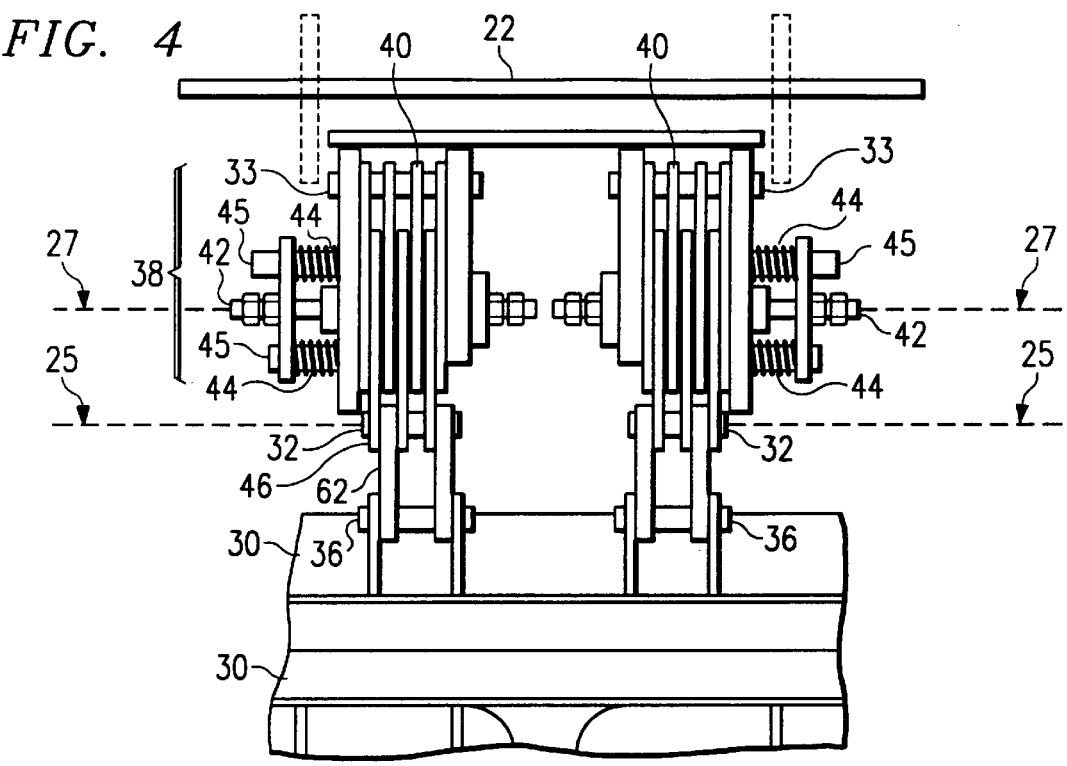
FIG. 4 is a rear elevation view of the dipper door snubber mechanism, with principle components mounted symmetrically about the centerline of the dipper assembly and crowd handle.

Referring to FIGS. 3 and 4, axis line 25 denotes the axis through which first door-snubber connection pins 32 are aligned. Also coaxial with dipper door pivot line 27 is a tensioning bolt 42 on snubber assembly 38. Snubber assembly 38 provides resistance to dipper door 30 to accommodate forces about dipper door pivot line 27, which result from the great weight of dipper door 30. Snubber assembly 38 may include a series of disks 40, which operate similar to a disk brake system in an automobile, and are connected in alternating fashion to snubber connection pin 33 and door-snubber connection pin 32. Disks 40 rotate about dipper door pivot line 27. The snubber assembly may also include a series of guide pins 45 and compression springs 44.

Figure 5:
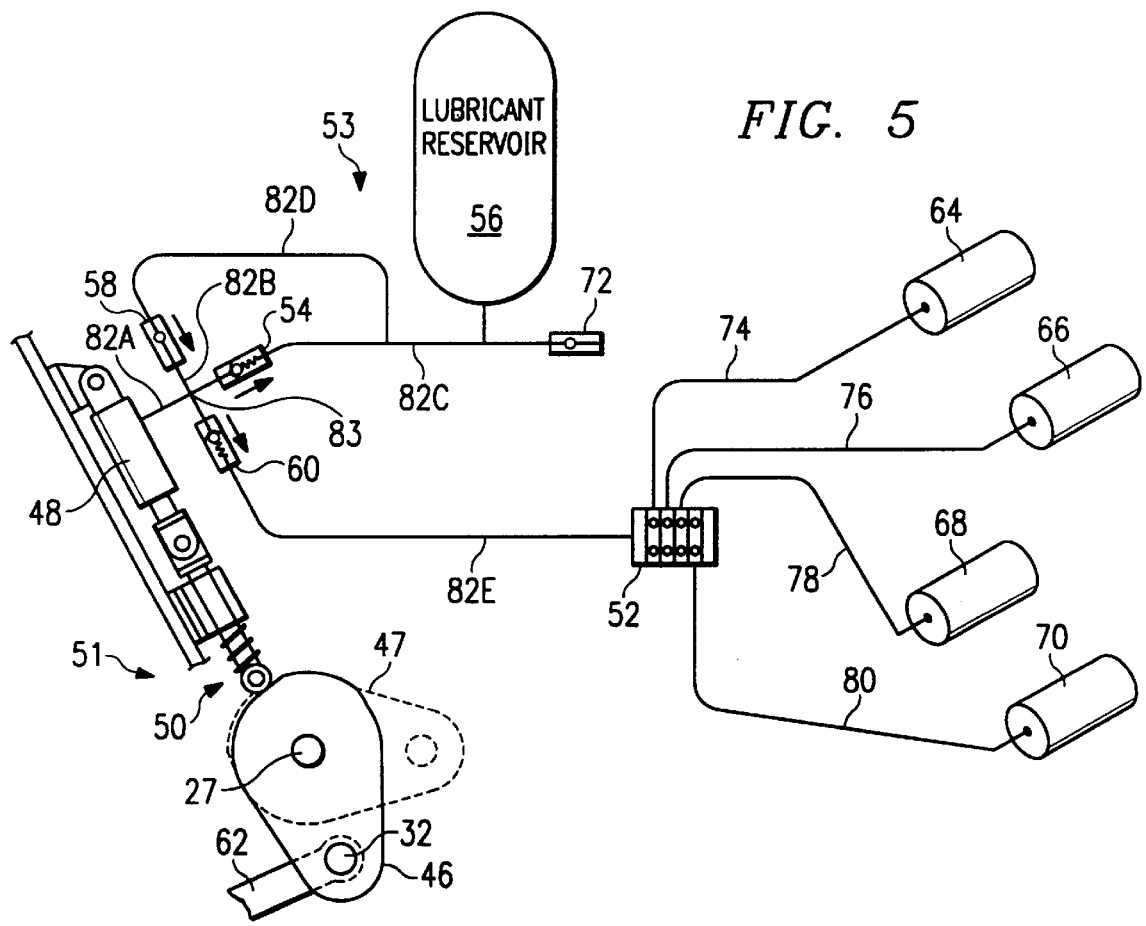
FIG. 5 is a schematic diagram of one embodiment of the present invention.

Referring now to FIG. 5, one embodiment of the present invention is shown. This embodiment includes an actuator 51, which in this instance is cam 46 and cam follower 50. The embodiment also includes a lubricant supply subsystem 53 and a pump 48.

Cam 46 is pivotal about axis 27 and may include one of the snubber disks 40. Cam 46 is also connected to first door-snubber connection pin 32 as shown best in FIG. 3. First door-snubber connection pin 32 is coaxial with axis line 25, shown in FIGS. 2, 3, and 4. Linkage 62 connects cam 46 at first door-snubber connection pin 32 to dipper door 30 at second door-snubber connection pin 36. Actuator 51 interfaces or is associated with lubricant supply subsystem 53 by the linking of cam follower 50 with pump cylinder 48.

With reference to FIG. 5, lubricant supply subsystem 53 will be described in more detail. A plurality of hoses or conduits interconnects much of subsystem 53. Fluidly connected to pump cylinder 48 is a hose 82A which extends to a pressure relief by pass valve 54. Intermediate bypass valve 54 and pump cylinder 48 is an intersection 83 providing fluid contact between hose 82A and hose 82B. Hose 82B extends between a check valve 58 and a flow control valve 60. Hose 82C extends from pressure relief bypass valve 54 to lubricant reservoir or accumulator 56 and to a tank-fill port 72. Intermediate pressure relief by pass valve 54 and lubricant reservoir 56 is hose 82D, which extends into check valve 58. Opposite of where hose 82B connects to flow control valve 60 is hose 82E.

Hose 82E is fluidly connected to sequence lubricator block 52. Sequence lubricator block 52 is connected to a first lubrication point 64 by hose 74. Sequence lubricator block 52 is connected to a second lubricator point 66 by hose 76. A third lubrication point is connected to sequence lubricator block by hose 78. Finally, sequence lubricator block 52 is connected to a fourth lubrication point by hose 80. Hoses 74, 76, 78 and 80 may in fact be formed by a plurality of smaller hoses bundled together. Furthermore, it is understood that while the specific embodiment shown in FIG. 5 includes four lubrication points 64, 66, 68 and 70, more or less lubrication points could be utilized.

Figure 6:
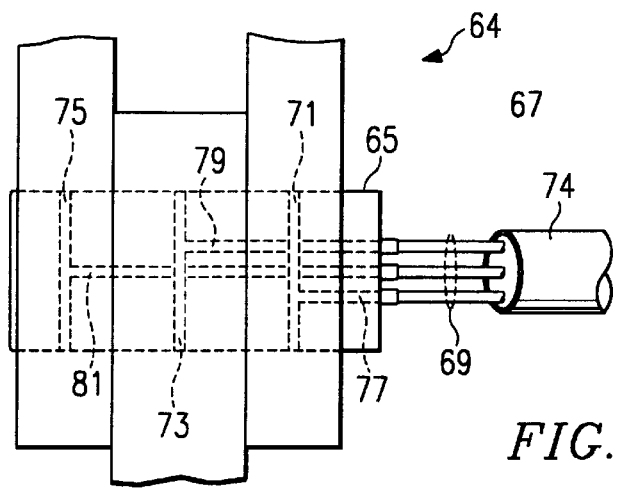
FIG. 6 is a diagram of a typical pin joint within the dipper assembly, and the internal passages for lubricant.

An expanded view of pin lubrication point 64 is shown in FIG. 6 for lubricating a pin 65. It is to be understood that sequence lubricator block 52 could contain any number of pin supply ducts 69 for providing lubricant to pin lubrication channels 71, 73, and 75 through pin lubrication supply channels 77, 79, and 81.

A number of flow control devices are used in this embodiment of subsystem 53. Check valve 58 only allows flow in the direction from hose 82D towards 82B. Flow control valve 60 allows flow only in the direction from hose 82B towards 82E. A pressure relief bypass valve 54 operates to prevent excessive system pressure buildup. Sequence lubricator block 52 may be a Manzel Series-Flow Type Feeder. Pump cylinder 48 may be mounted on dipper 24 proximate the handle 22, as shown in FIG. 2, or on handle 22 proximate to dipper 24, or at any other convenient location.

When pump cylinder 48 is compressed and thereby pressurized, a lubricant is forced through a flow control valve 60 into sequence lubricator block 52. If the lubricant pressure is excessive, a portion of the lubricant will flow through a relief valve 54 into an accumulator 56, which stores the lubricant. When dipper door 30 closes, the pump cylinder may return to a neutral position, with lubricant drawn through a check valve 58 to allow the return of, and may assist in, the return of pump cylinder 48 to a neutral position, thereby recharging the pump. One commercially available pump that is appropriate for use with the embodiment shown in FIG. 5 of the present invention is a Doering Cartridge Pump Series 241.

Accumulator 56 may be a pressurized tank. As discussed above in the context of the check valve 58, the pressurized lubricant returning through the check valve 58 may accommodate the return of pump cylinder 48 to a neutral position. Accumulator 56 could be placed in handle 22, as shown best in FIG. 2, dipper 24, dipper door 30, or a variety of other positions. Accumulator 56 may be sized to have sufficient capacity to require filling only at normal maintenance intervals. Tank fill port 72 may be located remote from other elements of the lubrication system to provide easy maintenance access.

In normal operation, when dipper door 30 is opened, linkage 62 causes cam 46 to rotate as reflected by the cam in position 47 of FIG. 5. Rotation of cam 46 causes cam follower 50 of actuator 51 to move pump cylinder 48 to cause lubricant therein to flow into hose 82A through joint or juncture 83 and further through flow control valve 60 and finally arriving at sequence lubricator block 52 by means of hose 82E. Sequence lubricator block 52 provides metered lubricant flow over several cycles of the machine in order to provide sufficient but not excessive flow of lubricant. When the lubricant arrives at sequence lubricator block 52, the lubricant is transmitted through hose 74 to a pin lubrication point 64. The next time cam 46 is activated and pump cylinder 48 is compressed, sequence lubricator block 52 will transmit lubricant through second hose 76 to pin lubrication point 66. A similar sequence is performed for lubrication points 68 and 70. For a sequence lubricator block with four hoses, each lubrication point 64, 66, 68, 70 will preferably receive lubricant approximately every two minutes.

Various changes may also be made to the lubricant supply subsystem; for example, pump unit 48 in FIG. 5 could be replaced with a ratcheting rotary type rather than the plunger actuated cylinder type shown. In the ratcheting type pump, for example, a shaft could be connected along dipper door pivot line 27. Opening of dipper door 30 would cause the shaft to rotate the ratcheting type rotary pump. Thus, lubrication as described above could occur at intervals that are a function of the opening of dipper door 30.

Figure 7:
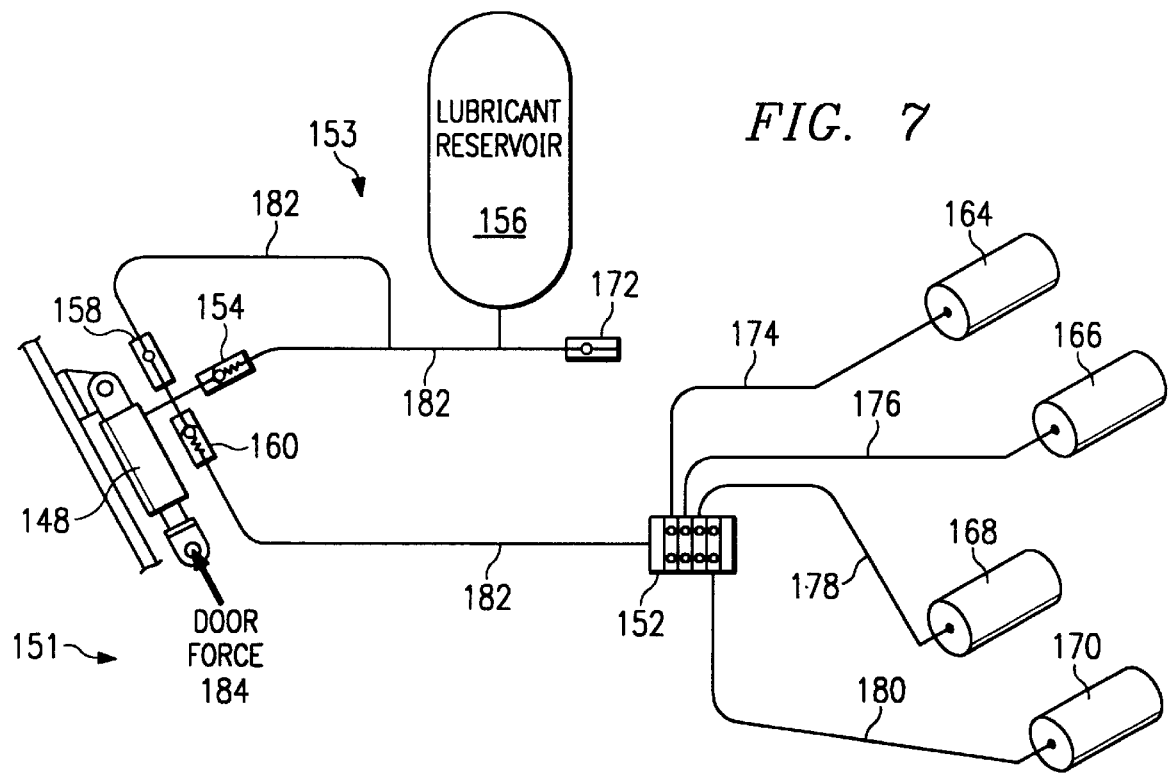
FIG. 7 is a schematic diagram of a second embodiment of the present invention.

Various changes may be made to actuator 51; for example, another embodiment of the present invention is shown in FIG. 7 that includes actuator 151. In the embodiment shown in FIG. 7, cam 46 and spring returned cam follower 50 have been removed. In this embodiment, dipper door 30 is directly connected to a pump cylinder 148. This connection could occur at the first snubber-door connection pin 32 or a variety of other points. The operation of the embodiment shown in FIG. 7 is substantially similar to that shown in FIG. 5 except that when dipper door 30 opens, pump cylinder 148 is directly compressed rather than actuated through the rotation of cam 46 and the resulting motion of cam follower 50.

Figure 8:
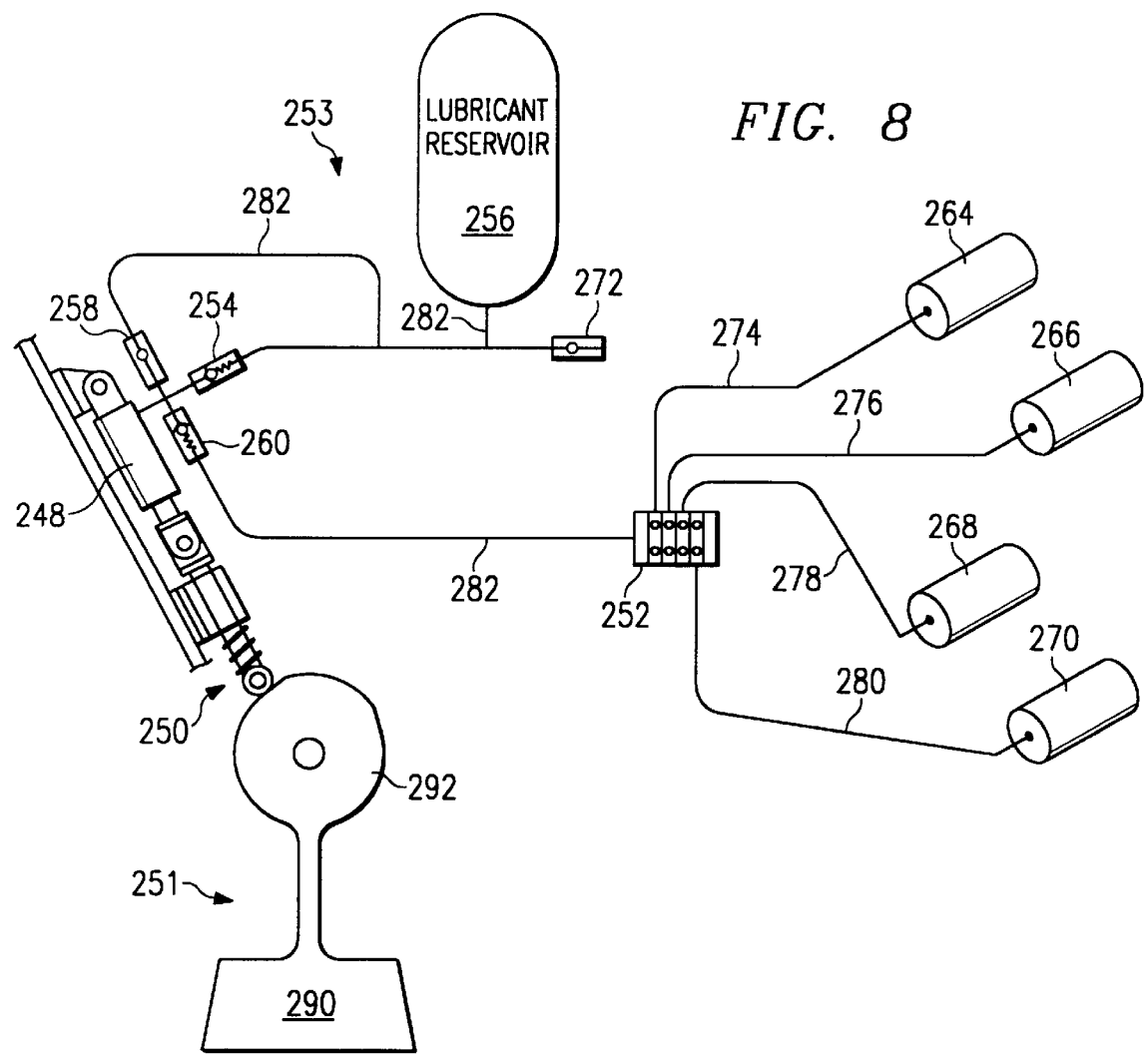
FIG. 8 is a schematic diagram of a third embodiment of the present invention.

Referring now to FIG. 8, a third embodiment of the present invention includes another alternative actuator 251. In this embodiment, rather than pivoting about dipper door pivot line 27, cam 292 pivots about any mounting point such as first snubber-door connection pins 32 or second snubber-door connection pins 36, or another convenient pivot linkage. When dipper 24 changes position, gravity will maintain dead weight 290 parallel to the ground. When dipper 24 moves to a more horizontal position, cam 292 will pivot relative to dipper 24. Thus, the pivoting of cam 292 relative to dipper 24 causes actuation of cam follower 250 and pump 248. In this embodiment, cam follower 250 and pump 248 could be mounted anywhere within dipper 24 or dipper handle 22. The operation of lubricator supply subsystem 253 shown in FIG. 8 is substantially similar to the automatic lubrication systems discussed in previous embodiments.

Figure 9:
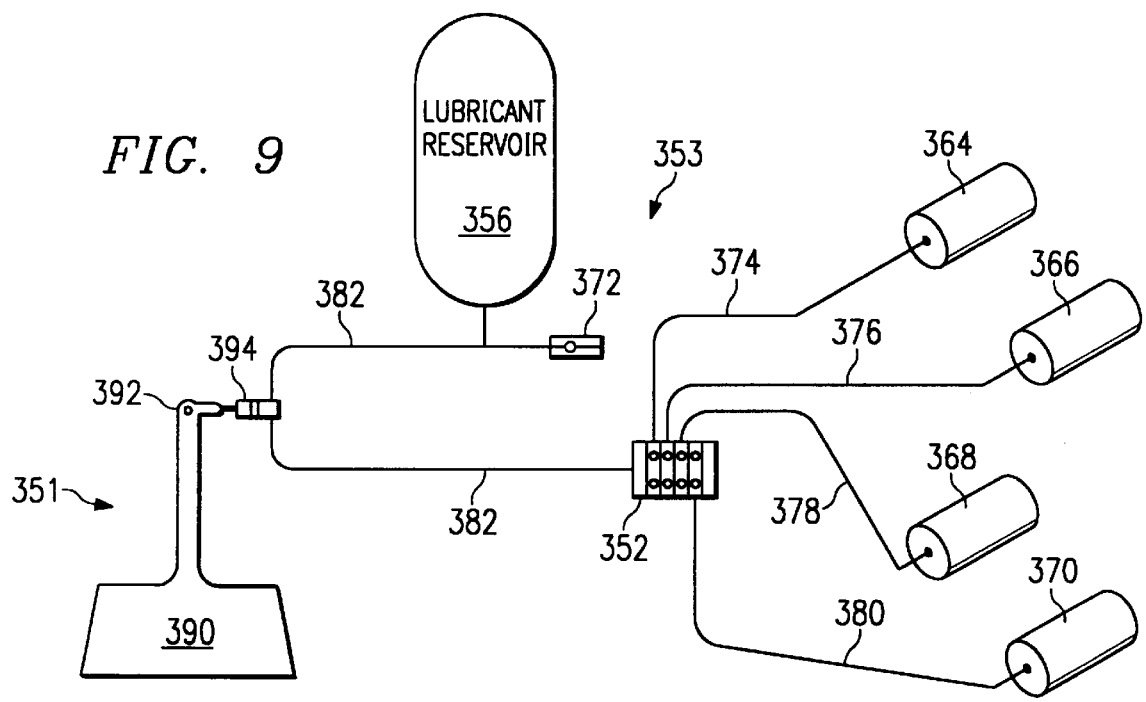
FIG. 9 is a schematic diagram of a fourth embodiment of the present invention.

Modifications or alternatives may be used in both the actuator and the lubricant supply subsystem in combination. For example, a fourth embodiment of the present invention is shown in FIG. 9 with actuator 351 and lubricant supply subsystem 353. In this embodiment, actuator 351 includes a dead weight 390 having a pivot linkage 392. Dead weight 390 is connected to dipper 24 at a convenient pivot linkage point 392. Dead weight 390 is pulled by gravity towards the ground. Therefore, when the dipper is positioned to a more horizontal position, dead weight 390 will pivot relative to dipper 24 about pivot linkage point 392 in a similar fashion to dead weight 290 as described above.

Lubricant supply subsystem 353 is analogous in most respects to the previously described lubricant supply subsystems 53, 153, and 253, but pump 48, 148, and 248 has been replaced by valve 394. Valve 394 is arranged such that rotation of dead weight 390 about pivot point 392 causes valve 394 to open and then when the relative angle between valve 394 and dead weight 390 is restored, valve 394 will close. When valve 394 is opened by the pivoting or relative movement of dead weight 390 with respect to valve 394, valve 394 releases lubricant from the accumulator 356 to sequence lubricator block 352 through hose 382. The operation of the remainder of lubricant supply subsystem 353 shown in FIG. 9 is analogous to the automatic lubrication system discussed in the previous embodiments.

In addition to providing lubrication based on the opening and closing of dipper door 30 as well as having relative position to dipper 24, the present invention may also utilize other motion of mining shovel 10 to coordinate lubrication of lubrication points with their use. Furthermore, the lubrication system of the present invention may be utilized for other connections and lubrication points on mining shovel 10.

Although the present invention has been described in detail, it should be understood that various changes, substitutions and alterations can be made hereto without departing from the spirit and scope of the invention as defined by the appended claims.

What is claimed is:

1. An automatic lubricating system for mining shovels having a dipper assembly, the system comprising:

an actuator associated with the dipper assembly and operable to move relative to a portion of the dipper assembly in response to movement by the dipper assembly under the influence of gravity;

a pump mechanism coupled to the actuator, the pump mechanism operable to pump in response to movement of the actuator relative to a portion of the dipper assembly;

a lubricant supply subsystem coupled to the pump mechanism for supplying lubrication to a selected location in response to pumping of the pump mechanism.

2. The automatic lubricating system for mining shovels of claim 1 wherein the pump mechanism creates a positive pressure to the lubricant supply subsystem in response to a force applied to the pump mechanism by the actuator.

3. The automatic lubricating system for mining shovels of claim 1 wherein the actuator comprises a rotating cam and a cam follower associated with the cam.

4. The automatic lubricating system for mining shovels of claim 1 wherein the pump mechanism comprises a plunger actuated cylinder pump having at least one valve for providing a lubricant discharge.

5. The automatic lubricating system for mining shovels of claim 1 wherein the lubricant supply subsystem comprises:

a lubricant reservoir;

a sequence lubricator block; and a plurality of conduits fluidly connecting the pump mechanism and reservoir to the sequence lubricator block and the sequence lubricator block to a selected lubrication site.

6. An automatic lubrication system for a mining shovel having a dipper structure and a system for lubricating a selected site comprising:

a dead weight having a cam portion pivotal about a point on the dipper structure of the mining shovel, the cam portion operable to pivot about the pivot point in response to movement by a portion of the dipper structure of the mining shovel;

a cam follower associated with the cam portion;

a pump mechanism pressurized by movement of the cam follower; and a lubricant supply subsystem coupled to the pump mechanism for supplying lubrication to the selected site in response to pivoting of the cam portion relative to motion of the dipper structure.

7. The automatic lubricating system for mining shovels of claim 6 wherein the pump mechanism creates a positive pressure to the lubricant supply subsystem in response to a force applied to the pump mechanism by the cam follower.

8. The automatic lubricating system for mining shovels of claim 6 wherein the pump mechanism comprises a plunger actuated cylinder pump having at least one valve for providing a lubricant discharge.

9. The automatic lubrication system for mining shovels of claim 6 wherein the lubricant supply subsystem comprises:

a lubricant reservoir;

a sequence lubricator block; and a plurality of conduits for fluidly connecting the pump mechanism and lubricant reservoir to the sequence lubricator block and the sequence lubricator block to a selected lubrication site.

10. An automatic lubricating system for mining shovels having a dipper structure, the system comprising a dead weight actuator pivotal under the influence of gravity about a point on the dipper structure, the actuator having a valve associated with the dead weight for dispensing lubricant in response to pivoting of the actuator relative to motion of the dipper.

11. The automatic lubricating system for mining shovels of claim 10 further comprising:

a pressurized lubricant reservoir;

a sequence lubricator block; and a plurality of conduits for fluidly connecting the valve and reservoir to the sequence lubricator block and the sequence lubricator block to a selected lubrication site.

12. A method of automatically lubricating a connection point of a mining shovel having a dipper comprising the steps of:

providing a lubricant supply system for dispensing a lubricant;

providing an actuator for controlling the dispensing of the lubricant;

activating the actuator through movement of a portion of the mining shovel under the influence of gravity; and delivering lubricant from the lubricant supply subsystem to the connection point of the mining shovel in response to activating the actuator through movement of a portion of the mining shovel under the influence of gravity.

13. The method of claim 12 wherein the step of activating the actuator through movement of a portion of the mining shovel under the influence of gravity comprises activating the actuator through movement of the dipper.

14. The method of claim 12 wherein the steps of providing the actuator and activating the actuator through movement of a portion of the mining shovel comprise:

forming a pivot point on the dipper;

movably connecting a cam to the pivot point in proximity to the dipper such that the cam will rotate in response to movement of the dipper; and moving the dipper to cause the cam to move and thereby activate the lubricant supply subsystem.

15. The method of claim 12 further comprising the step of metering the flow of the lubricant.

16. A method of automatically lubricating a selected site of a mining shovel, the method comprising the steps of:

providing a lubricant supply system for dispensing a lubricant;

providing an actuator on the shovel such that a first portion of the actuator will move relative to the shovel under the influence of gravity, and in response to movement of the shovel;

activating a second portion of the actuator through movement of the first portion; and delivering lubricant from the lubricant supply subsystem to the selected site in response to activation of the second portion.

17. A mining shovel having connection points, the mining shovel comprising:

a dipper;

an automatic lubrication system coupled to the mining shovel for lubricating at least one of the connection points on the mining shovel, the lubrication system comprising:

a pump pressurized by movement of a portion of the mining shovel;

a pump actuating device coupled to the pump for controlling the pump by movement of a portion of the mining shovel;

a lubricant metering unit for metering flow of lubricant in the lubrication system;

an accumulator for storing lubricant; and a plurality of conduits for providing a pathway for lubricant to flow and for fluidly connecting the pump, accumulator, lubricant metering unit, and at least one of the connection points.

18. The mining shovel of claim 17 wherein the pump actuating device is coupled to the dipper of the mining shovel.

19. The mining shovel of claim 18 wherein the pump actuating device is coupled to the dipper door of the mining shovel.

20. The mining shovel of claim 17 wherein the lubricant metering means comprises a sequence lubricator block.

21. The mining shovel of claim 17 wherein the pump comprises a plunger-actuated pump.

22. The mining shovel of claim 19 further comprising a lubrication pin formed with channels therein for delivering lubricant to an exterior surface of the lubrication pin.

* * * * *